(12) United States Patent
Jung et al.

(10) Patent No.: US 12,223,472 B2
(45) Date of Patent: Feb. 11, 2025

(54) XR-BASED SUPERVISION ASSISTING DEVICE, METHOD AND PROGRAM

(71) Applicants: Jae Heon Jung, Seoul (KR); Yu Mi Lee, Incheon (KR); SLZ Inc., Incheon (KR)

(72) Inventors: Jae Heon Jung, Seoul (KR); Yu Mi Lee, Incheon (KR)

(73) Assignees: Jae Heon Jung, Seoul (KR); Yu Mi Lee, Incheon (KR); SLZ Inc., Siheung-si (KR)

( * ) Notice: Subject to any disclaimer, the term of this patent is extended or adjusted under 35 U.S.C. 154(b) by 405 days.

(21) Appl. No.: 17/843,479

(22) Filed: Jun. 17, 2022

(65) Prior Publication Data

US 2022/0405718 A1  Dec. 22, 2022

(30) Foreign Application Priority Data

Jun. 21, 2021  (KR) ......................... 10-2021-0080394

(51) Int. Cl.
| | |
|---|---|
| *G06T 19/00* | (2011.01) |
| *G06Q 10/20* | (2023.01) |
| *G06T 7/70* | (2017.01) |
| *G06T 19/20* | (2011.01) |
| *G06V 10/74* | (2022.01) |
| *G06V 20/20* | (2022.01) |

(52) U.S. Cl.
CPC ............... *G06Q 10/20* (2013.01); *G06T 7/70* (2017.01); *G06T 19/006* (2013.01); *G06T 19/20* (2013.01); *G06V 10/761* (2022.01); *G06V 20/20* (2022.01); *G06T 2207/30204* (2013.01); *G06T 2210/04* (2013.01); *G06T 2219/2021* (2013.01)

(58) Field of Classification Search
None
See application file for complete search history.

(56) References Cited

U.S. PATENT DOCUMENTS

| | | | |
|---|---|---|---|
| 2013/0282345 A1* | 10/2013 | McCulloch | G06F 3/0304 703/6 |
| 2015/0181200 A1* | 6/2015 | Arrasvuori | G06V 20/64 348/46 |
| 2019/0033074 A1* | 1/2019 | Ikeda | G01B 11/14 |
| 2019/0347783 A1* | 11/2019 | Salgian | G02B 27/017 |
| 2020/0234498 A1* | 7/2020 | Price | G06T 7/12 |

FOREIGN PATENT DOCUMENTS

KR  10-2232181 B1  3/2021

* cited by examiner

*Primary Examiner* — Yi Wang
(74) *Attorney, Agent, or Firm* — Studebaker & Brackett PC

(57) ABSTRACT

The present disclosure relates to an extended reality (XR)-based supervision assisting device, which finds a construction error by comparing a real design object photographed by a camera of the supervision assisting device with building information modelling (BIM) design data, and corrects the BIM design data to fit the real design object when the construction error between the real design object and the BIM design data exceeds a preset error tolerance range, thereby adjusting the BIM design data according to the construction error.

18 Claims, 12 Drawing Sheets

XR-BASED SUPERVISION ASSISTING DEVICE, METHOD AND PROGRAM

CROSS-REFERENCE TO RELATED APPLICATION

A claim for priority under 35 U.S.C. § 119 is made to Korean Patent Application No. 10-2021-0080394 filed on Jun. 21, 2021 in the Korean Intellectual Property Office, the entire contents of which are hereby incorporated by reference.

BACKGROUND

1. Technical Field

The present disclosure relates to a device for assisting supervision in a construction site, and more particularly, to a device for assisting supervision in a construction site based on extended reality.

2. Description of Related Art

When a construction site is inspected on the basis of a building information modelling (BIM)-based design drawing due to the characteristics of a construction site, a construction error is always found.

The construction error increases the total construction cost by 15% or more and increases the construction period.

In addition to such a problem, when the construction site is inspected and supervised in the same manner as in conventional methods, the construction period is increased.

Recently, an artificial intelligence technology and an augmented reality technology are applied to various fields. In a case in which such technologies are applied to a construction site to inspect and supervise the construction site, it is expected to improve accuracy in construction and building. However, such technology is not open yet.

SUMMARY

The present disclosure has been made to solve the above-mentioned problems occurring in the prior art, and in an aspect of the present disclosure, and is to assist supervision using an extended reality (XR)-based supervision assisting device.

Furthermore, the present disclosure is to find a construction error by comparing a real design object photographed by a camera of the supervision assisting device with building information modelling (BIM) design data, and to notify the construction error to the supervision assisting device.

In addition, the present disclosure is to correct the BIM design data to fit the real design object so that the BIM design data is matched to the construction error when the construction error between the real design object and the BIM design data exceeds a preset error tolerance range.

The aspects of the present disclosure are not limited to those mentioned above, and other aspects not mentioned herein will be clearly understood by those skilled in the art from the following description.

To accomplish the above objects, in an aspect of the present disclosure, there is provided an extended reality (XR)-based supervision assisting device including: a camera; a transparent display unit; a communication unit acquiring 3D-based BIM design data for at least one real design object actually installed in the construction site; and a processor performing operations of: recognizing the real design object that a supervisor is watching through the transparent display unit, based on an image photographed by the camera; acquiring the BIM design data for the recognized real design object through the communication unit; rendering a virtual XR design object for the real design object on the basis of the acquired BIM design data; displaying the rendered XR design object at a position corresponding to the real design object on the transparent display unit; comparing the BIM design data of the XR design object with the photograph image, and checking an error between the XR design object and the real design object; and informing the supervisor of that the checked error deviates from a predetermined allowable error range.

In another aspect of the present invention, there is provided an extended reality (XR)-based supervision assisting device including: a camera; a display unit; a communication unit acquiring 3D-based BIM design data for at least one real design object actually installed in the construction site; and a processor performing operations of: receiving an image which is photographed by the camera and includes the real design object and displaying the image on the display unit; acquiring the BIM design data for the real design object in the photographed image; rendering a virtual XR design object for the real design object on the basis of the acquired BIM design data; displaying the rendered XR design object at a position corresponding to the real design object on the display unit; comparing the BIM design data of the XR design object with the photograph image, and checking an error between the XR design object and the real design object; and informing the supervisor of that the checked error deviates from a predetermined allowable error range.

Moreover, the processor performs the operations of: recognizing at least one reference mark in the image; checking an error by matching the real design object in the image with the BIM design data of the XR design object based on the recognized reference mark; and specifying a position of the checked error on the basis of current location information of the supervision assisting device and the position of the recognized reference mark.

Furthermore, the processor performs the operations of: requesting correction of the BIM design data corresponding to the checked error to a server according to a control signal input to the supervision assisting device; and re-rendering the virtual XR design object for the real design object on the basis of the corrected BIM design data when receiving the BIM design data in which the error is corrected from the server.

Additionally, the server stores location information on at least one reference mark installed in the construction site and the BIM design data, loads the location information of the corresponding reference mark when receiving an image of the reference mark photographed by the camera from the supervision assisting device, and transmits the BIM design data within a predetermined range from the corresponding reference mark to the supervision assisting device.

In addition, when the checked error exceeds an allowable error range, the server corrects a portion of the BIM design data in which the error has occurred to match the real design object, and provides the corrected BIM design data to the supervision assisting device. The processor renders a virtual XR design object for the real design object on the basis of the corrected BIM design data received from the server, and provides correction completion information.

Moreover, the processor analyzes the BIM design data and derives a supervision progress direction from a starting position of the supervision. When correction of the checked error is completed, the processor renders and displays an XR content guiding the next supervision position on the basis of the supervision progress direction and the current position of the supervision assisting device.

Furthermore, the server generates learning data on the basis of the BIM design data within a predetermined range from the checked error position and performs deep learning by inputting the learning data into an error prediction model. When a BIM design data of a new supervision object is input, the processor analyzes the BIM design data of the new supervision object based on the error prediction model, predicts an error occurrence position in the new supervision object, and provides the predicted position to the supervision assisting device.

In a further aspect of the present invention, there is provided an extended reality (XR)-based supervision assisting method carried out by an extended reality (XR)-based wearable supervision assisting device for assisting supervision of a construction site, the XR-based supervision assisting method including the operations of: recognizing a real design object that a supervisor is watching through a transparent display unit, based on an image photographed by a camera of the supervision assisting device; acquiring BIM design data for the recognized real design object; rendering a virtual XR design object for the real design object on the basis of the acquired BIM design data; displaying the rendered XR design object at a position corresponding to the real design object on the transparent display unit; comparing the BIM design data of the XR design object with the photograph image, and checking an error between the XR design object and the real design object; and informing the supervisor of that the checked error deviates from a predetermined allowable error range.

Besides the above, other methods and systems for embodying the present disclosure and a computer readable recording medium to record a computer program for executing the method may be additionally provided.

DETAILED DESCRIPTION

Advantages and features of the present disclosure and methods accomplishing the advantages and features will become apparent from the following detailed description of exemplary embodiments with reference to the accompanying drawings. However, the present disclosure is not limited to exemplary embodiment disclosed herein but will be implemented in various forms. The exemplary embodiments are provided so that the present disclosure is completely disclosed, and a person of ordinary skilled in the art can fully understand the scope of the present disclosure. Therefore, the present disclosure will be defined only by the scope of the appended claims.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present disclosure, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, preferred embodiments of the present disclosure will be described in detail with reference to the accompanying drawings.

Figure 1:
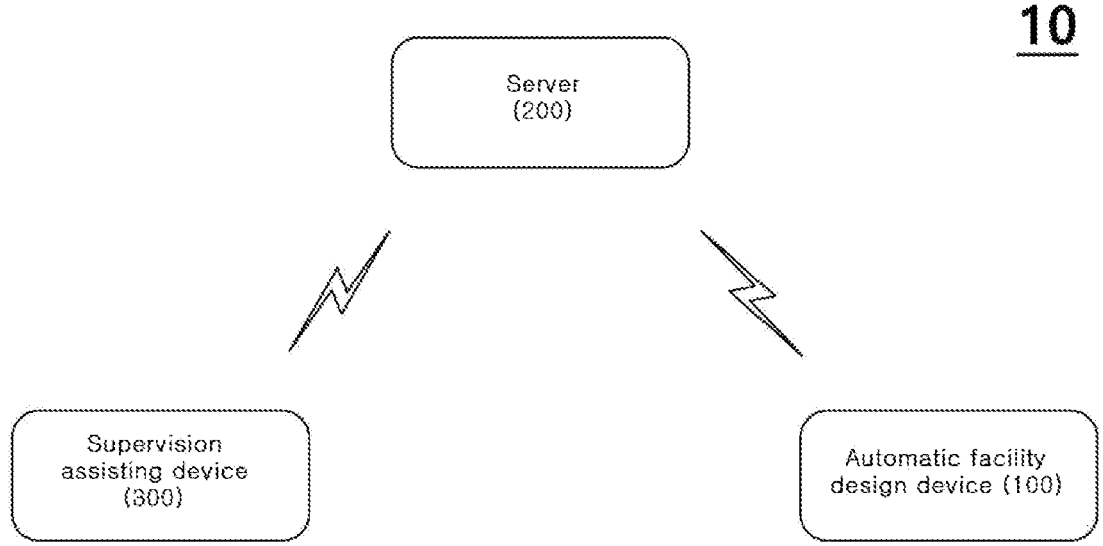
FIG. 1 is a schematic diagram of an extended reality (XR)-based supervision assisting system according to an embodiment of the present disclosure.

FIG. 1 is a schematic diagram of an extended reality (XR)-based supervision assisting system 10 according to an embodiment of the present disclosure.

The extended reality (XR)-based supervision assisting system 10 according to an embodiment of the present disclosure includes an automatic facility design device 100, a server 200, and a supervision assisting device 300.

The present specification includes three embodiments of the automatic facility design device 100, the server 200 for providing design construction and supervision services, and the XR-based supervision assisting device 300.

The automatic facility design device 100 automatically designs facilities in 3D-based BIM design data so as to complete BIM design data, and the server 200 transmits the BIM design data to a construction company to perform construction. A supervisor carries out supervision work using the supervision assisting device 300.

Moreover, the server 200 corrects BIM design data from various information received from the supervision assisting device 300, and receives and stores a design review checked by the supervisor.

More detailed descriptions of the embodiments will be provided with reference to FIGS. 2 to 12.

Figure 2:
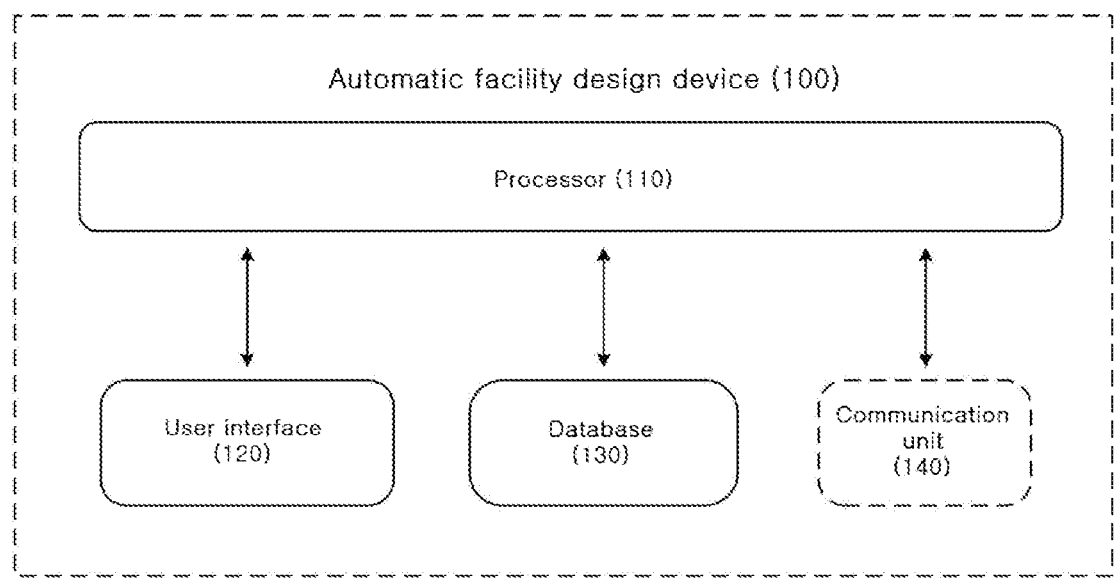
FIG. 2 is a block diagram of an automatic facility design device according to an embodiment of the present disclosure.

FIG. 2 is a block diagram of an automatic facility design device according to an embodiment of the present disclosure.

Figure 3:
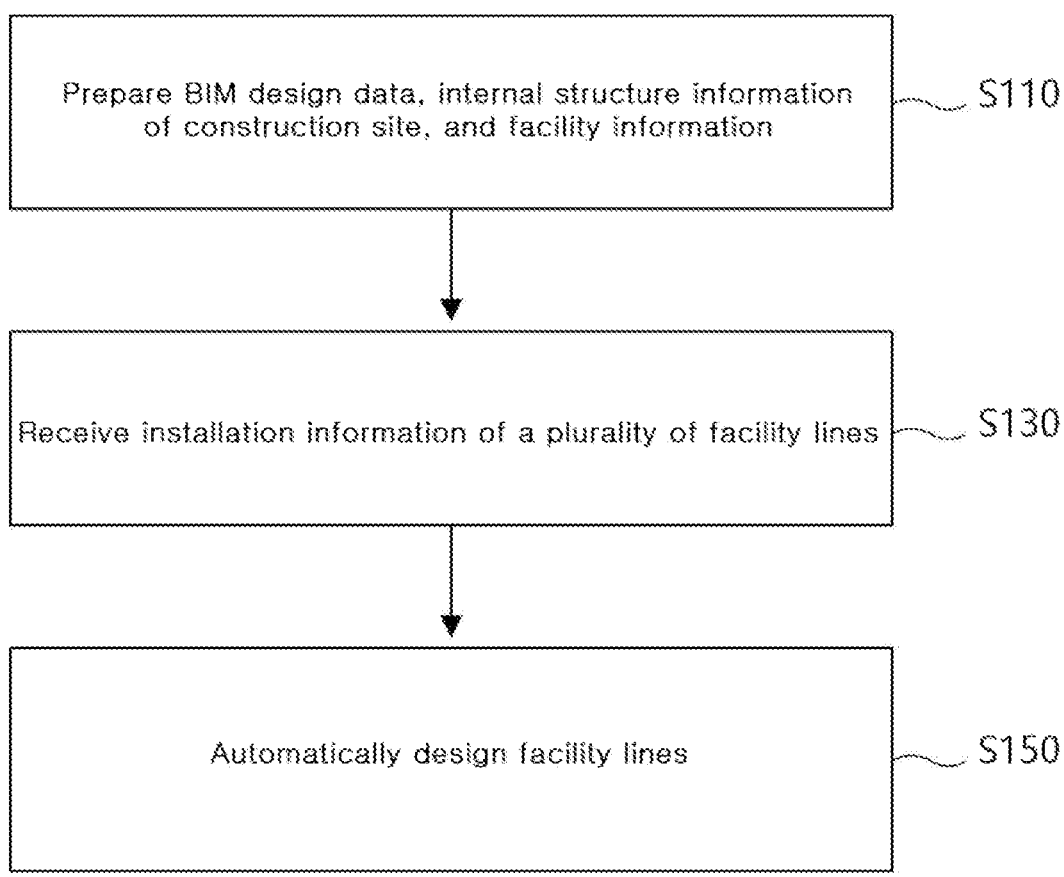
FIG. 3 is a flow chart of an automatic facility design method according to an embodiment of the present disclosure.

FIG. 3 is a flow chart of an automatic facility design method according to an embodiment of the present disclosure.

Referring to FIG. 2, the automatic facility design device 100 according to the embodiment of the present disclosure includes a processor 110, a user interface 120, and a database 130, and may further include a communication unit 140 according to an embodiment.

The automatic facility design device 100 according to the embodiment of the present disclosure may be implemented as a computer or an information processing means, or may be implemented in the form of a server.

Figure 7:
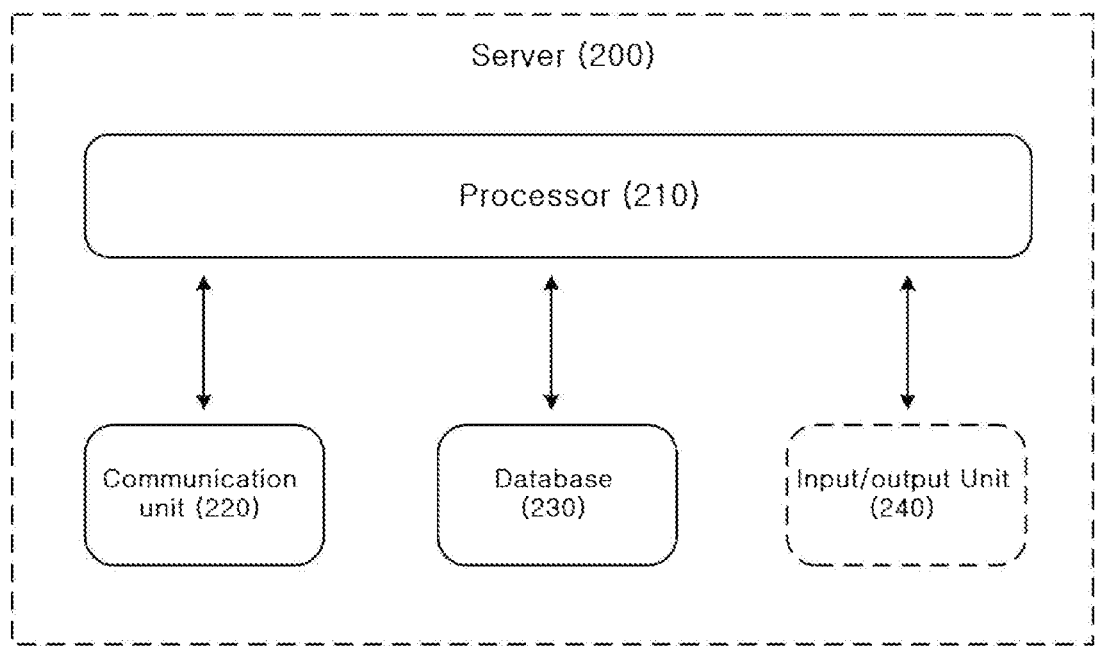
FIG. 7 is a block diagram of a server for providing design, construction, and supervision services according to an embodiment of the present disclosure.

The automatic facility design device 100 according to the embodiment of the present disclosure may be separately configured, but may be included in the server 200 for providing design, construction and supervision services of FIG. 7.

The database 130 stores 3D-based BIM design data of a construction site, information on an internal structure of the construction site, information on facilities to be arranged in the construction site, and the like.

The user interface 120 receives facility installation information for facility design (mechanical electrical plumbing design) in the 3D-based BIM design data.

In more detail, the user interface 120 can receive facility installation information for facility design (mechanical electrical plumbing design) in the 3D-based BIM design data.

In one embodiment, facility installation information is applicable to information for facility line design.

As described above, in the case that the automatic facility design device 100 is configured as a server, the automatic facility design device 100 further includes a communication unit 140 having a wired/wireless communication function, and the processor 110 can form the user interface 120 by using a terminal connected through the communication unit 140.

The processor 110 serves to operate all components in the automatic facility design device 100, and executes a method for automatically designing facilities by carrying out commands and algorithms stored in the database 130.

In this instance, the internal structure information can refer to data in which an actual construction site is three-dimensionally scanned through a 3D lidar sensor, and the 3D scan data is stored by being matched with the BIM design data so that coordinates in the BIM design data of the 3D scan data is stored in the database 130.

Accordingly, when receiving an image captured by a camera 350 or sensing data of a lidar 340, a processor 210 or 310 matches it with the internal structure information stored in a database 130, 230 or 330 in order to load coordinate information in the construction site, matches it with the BIM design data.

Since the processor 110 according to the embodiment of the present disclosure designs facilities in the 3D-based BIM design data, facilities, facility design data, facility lines, and facility line design data designed by the processor 110 are also designed three-dimensionally so that XR-based supervision may be carried out later.

According to the embodiment of the present disclosure, the facility may include various elements necessary for factory design, and a facility line can be applied as a representative example.

In the following embodiment, a facility line as a representative example will be described.

The facility which will be described in the following embodiment means a facility line.

Moreover, the facility line in the embodiment of the present disclosure may be one of various facility lines, such as a pipe line, an electric cable line, a communication cable line, a duct line, and the like, and a pipe line may be applied representatively as illustrated in the drawings.

Hereinafter, the operation performed by the processor 110 will be described in detail with reference to FIG. 3.

The processor 110 includes BIM design data of a construction site, internal structure information of the construction site, and information on facilities, which will be arranged in the construction site, in the database 130. (S110)

The processor 110 receives a plurality of facility line installation information including a starting point and an ending point for installing the facility line in the BIM design data of the construction site through the user interface 120. (S130)

In consideration of avoidance conditions as well as the internal structure information of the construction site and the information on facilities, which will be arranged in the construction site, the processor 110 automatically designs facility lines corresponding to installation information of a plurality of facility lines in the BIM design data. (S150)

In this instance, the internal structure information of the construction site may correspond to a variety of internal structure information which can be related to designing facilities.

In addition to the starting point and the ending point for installation of the facility line, the facility line installation information may include any information related to a use purpose of the facility line, materials of the facility line, a diameter of the facility line, and the like.

When the plurality of facility lines are overlapped at least partially in a process of designing the facility line by performing the operation S150, the processor 110 correct the design data in such a way as to push the plurality of facility lines overlapped in the facility line design data on the basis of radiuses of the plurality of overlapped facility lines and sizes of the overlapped areas so that the plurality of facility lines are not overlapped.

The processor 110 designs the plurality of facility lines on the construction site through the above operation in order to generate facility line design data, and completes facility line design data by pushing the plurality of facility lines having the overlapped areas in the facility line design data.

In this instance, the processor 110 can add facility line design data to the BIM design data after generating additional facility line design data, and can directly design a facility line on the BIM design data.

According to an embodiment of the present disclosure, the processor 110 corrects the plurality of facility lines overlapped in the BIM design data, and corrects the plurality of facility lines so as not to exceed the number of allowable inflection points of the facility line.

For example, if the plurality of overlapped facility lines are corrected without setting such a condition, correction may be performed while a large number of inflection points are generated.

In addition, if a large number of inflection points are generated, facility line installation costs (construction costs) can be increased, and complexity of the construction can be increased.

However, when the allowable number of inflection points is set, the automatic facility design device 100 according to an embodiment of the present disclosure can prevent the processor 110 from exceeding the allowable number of inflection points and can correct the plurality of facility lines.

In one embodiment, the processor 110 designs all of the facility lines existing in the design data to be bent at 90 degrees.

In this instance, if there is at least one facility line which has an angle deviating from the angle of 90 degrees after the correction of the plurality of facility lines, the processor 110 can output a notification instructing correction of the corresponding facility line.

The automatic facility design device 100 according to an embodiment of the present disclosure designs and corrects the facility line to have the angle of 90 degrees without any tilting angle.

However, since it is possible to design and correct at least one facility line to have a tilting angle other than 90° by various variables, such as BIM design data, internal structure information of a construction site, etc., when the facility line exists, the processor 110 provides a notification to a user or a manager to correct it, thereby correcting an error in automatic design which may happen.

In one embodiment, the processor 110 includes correction conditions, such as materials and use purposes of the plurality of overlapped facility lines, and can determine whether to correct the plurality of facility lines overlapped to minimize design costs, and determine a range to be pushed.

As described above, the facility line installation information may include use purposes of the facility lines, materials of the facility lines, diameters of the facility lines, and the likes as well as the starting point and the ending point for installing the facility lines.

Therefore, the facility lines installed in a construction site may have different use purposes even from facility lines installed near the other facility lines, and so, the facility lines have different materials.

In consideration of the above, the processor 110 corrects the plurality of overlapped facility lines in a manner of pushing each other, and determines whether to correct the plurality of facility lines overlapped to minimize design costs, and determines a range to be pushed, thereby reducing facility line construction costs in the construction site.

For example, in a state in which a facility line A and a facility line B are overlapped in a certain range, a unit price per length of the facility line A is still higher than that of the facility line B, the processor 110 can correct the facility lines in such a way as to minimize correction of the facility line A and to correct a location and a route of the facility line B.

In one embodiment, the processor 110 may further include a facility line joint material cost accompanied by a facility line inflection point generated while correcting the plurality of overlapped facility lines as a correction condition.

For instance, when the number of inflection points of the facility line is increased, the facility line joint material cost is added, and the cost may be further changed depending on types, use purposes, materials of the facility lines, and the like.

Therefore, the processor 110 further includes such matters as the correction condition to perform correction of the overlapped facility lines, thereby reducing facility line construction costs.

In one embodiment, the processor 110 can determine materials and radiuses of the facility lines based on the process information of the construction site and the use purpose of the facility lines.

For this operation, the database 130 stores an algorithm capable of determining materials and radiuses of the facility lines according to the use purpose of the facility lines and the process information of the construction site in which the facility lines are installed, and the processor 110 can be operated on the basis of the algorithm.

Therefore, the present invention can automatically design materials and radiuses of the facility lines even though the user directly determines materials and radiuses of the facility lines to be designed.

In addition, the processor 110 designs the facility lines in order of installation information of the facility lines in which a straight distance between the starting point and the ending point is close among input installation information of the plurality of facility lines.

In one embodiment, the processor 110 can derive at least one reference mark installation position suitable for installation of a reference mark required so that an XR device for supervision matches actual measurement data of the construction site and the BIM design data during a site supervision process of the construction site on the basis of the BIM design data in which the design of facilities is completed and the internal structure information of the construction site.

According to the embodiment of the present disclosure, when design of facilities is completed and BIM design data is completed, the server 200 provides the BIM design data to a construction company, and the construction company carries out construction based on the BIM design data.

In addition, a supervisor (user) for supervising the construction site wears the XR-based supervision assisting device and photographs the construction site to supervise the construction site. The server 200 matches the actual measurement data of the site with the BIM design data based on images photographed by the supervision assisting device so as to check an error.

In this instance, the reference mark is used to accurately match the actual measurement data of the site and the BIM design data, and the automatic facility design device 100 derives and provides the installation position suitable for installation of a reference mark on the basis of the BIM design data and the internal structure information of the construction site.

In one embodiment, the automatic facility design device 100 can derive a plurality of reference mark installation positions, and generate an image or a code for each reference mark.

The image or code is a means capable of identifying each reference mark, and the database 230 of the server 200 stores the image or code of each reference mark together with the location information of the reference mark.

The automatic facility design device 100 according to the embodiment of the present disclosure can improve a design process into a field-centered type design process by introducing AI technology in a BIM-based MEP design process.

Moreover, the processor 110 can execute a connection facility line between facilities by selecting a suitable authoring tool among a rhino 3D grasshopper, a dynamo script, and an unreal engine blueprint.

Figure 4:
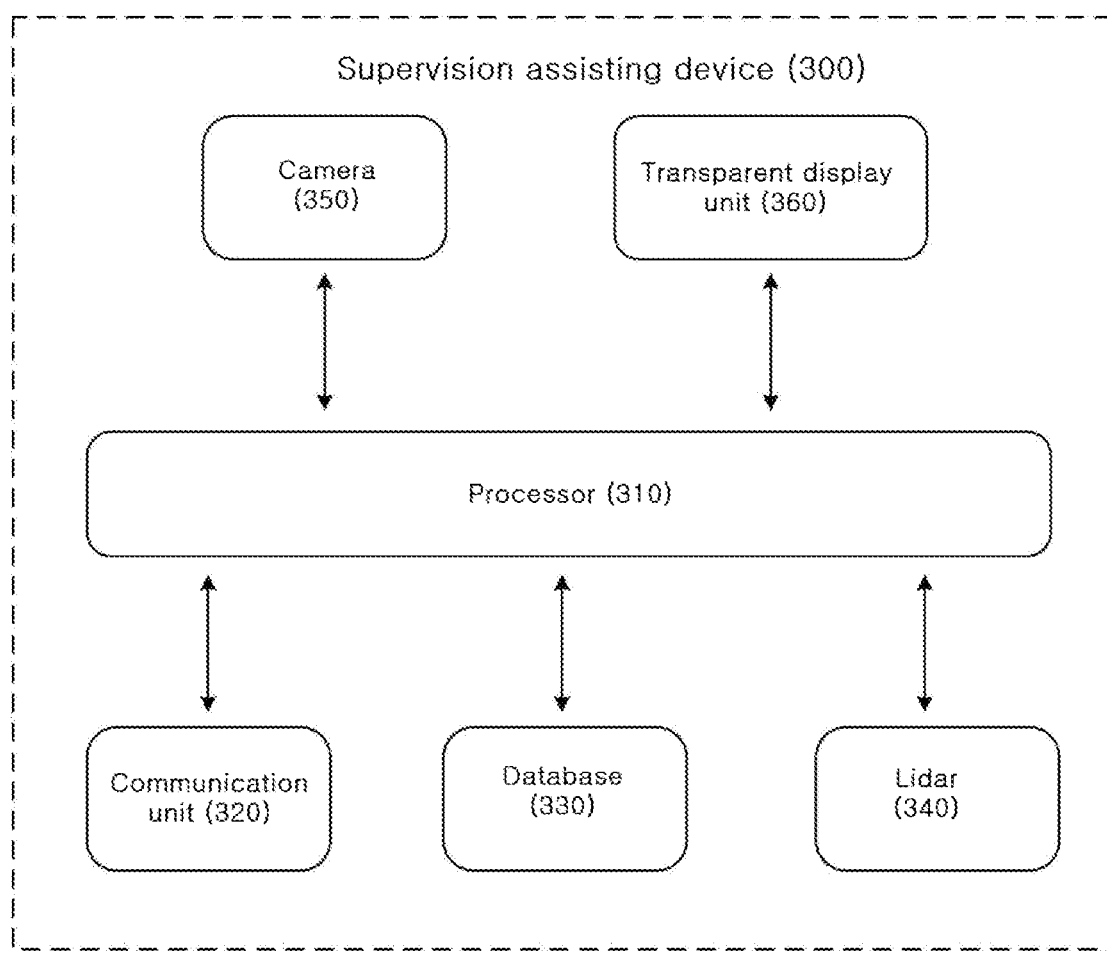
FIGS. 4 and 5 are block diagrams of an extended reality (XR)-based supervision assisting device according to an embodiment of the present disclosure.
Figure 5:
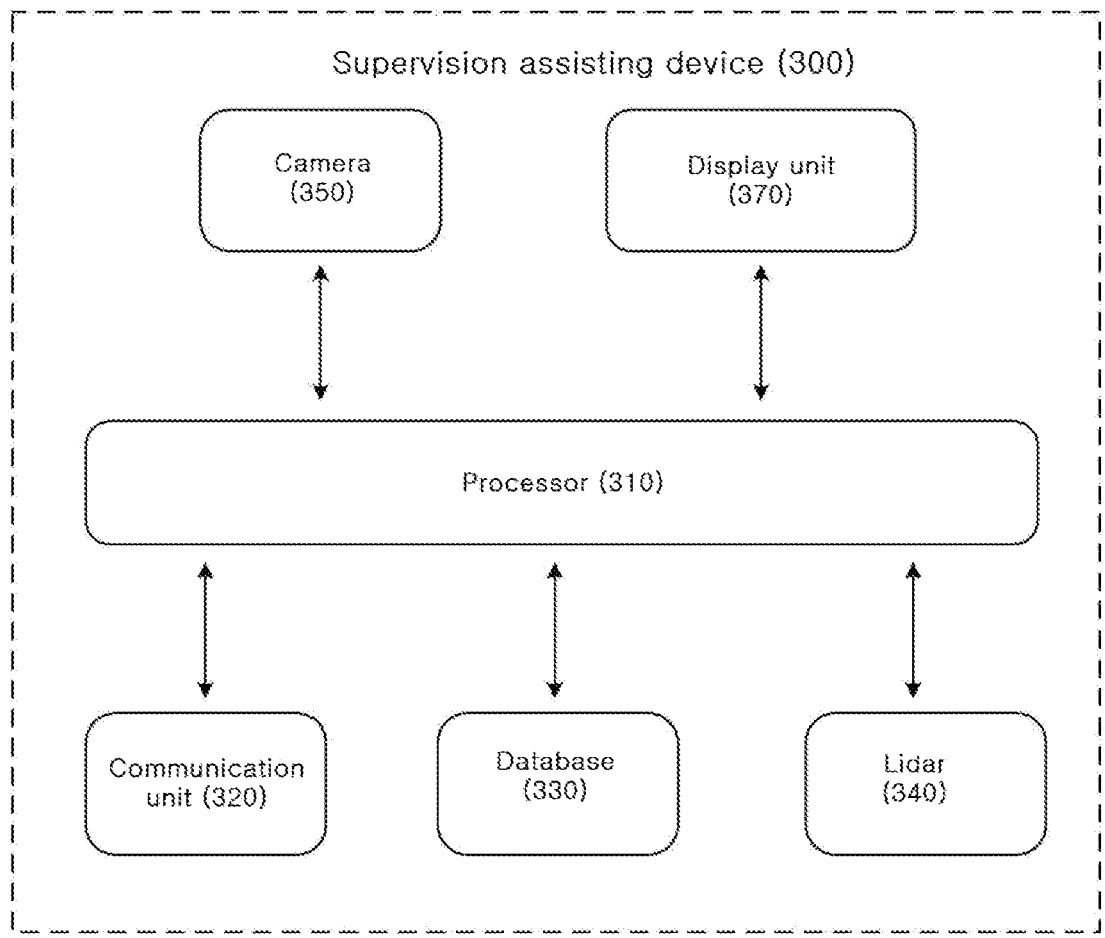

FIGS. 4 and 5 are block diagrams of an extended reality (XR)-based supervision assisting device 300 according to an embodiment of the present disclosure.

Figure 6:
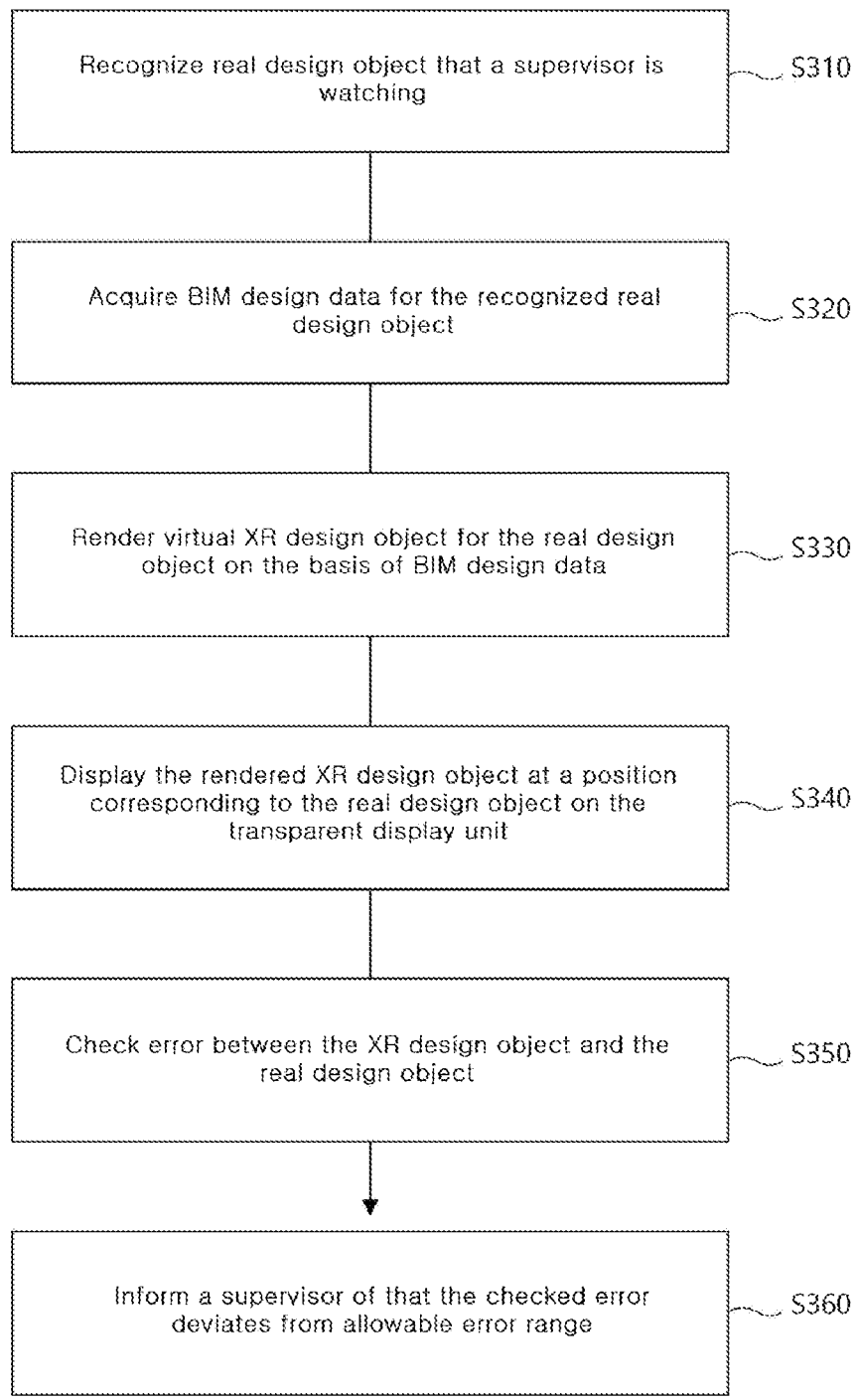
FIG. 6 is a flow chart of an extended reality (XR)-based supervision assisting method according to an embodiment of the present disclosure.

FIG. 6 is a flow chart of an extended reality (XR)-based supervision assisting method according to an embodiment of the present disclosure.

FIG. 4 illustrates that the supervision assisting device 300 is configured in the form of wearable glasses, and FIG. 5 illustrates that the supervision assisting device 300 is configured in the form of a terminal, a tablet PC or the like.

Therefore, the supervision assisting device 300 allows a supervisor (user) to wear the supervision assisting device 300 and supervises a construction site while watching a transparent display unit 360, the supervision assisting device illustrated in FIG. 5 allows a supervisor (user) to carry the supervision assisting device 300 with the hand and supervises a construction site while watching a display unit 370.

Hereinafter, the supervision assisting device 300 according to the embodiment of the present disclosure is mainly used by a supervisor who supervises a construction site, but is not limited thereto. So, hereinafter, the supervisor will be referred to as a user.

In other words, the user mentioned in an embodiment may mean a supervisor.

However, the present disclosure is not limited thereto. A user may supervise a construction site while wearing the supervision assisting device 300 as illustrated in FIG. 4 and carrying the supervision assisting device 300 with the hand at the same time. In the above case, the server 200 can support a dual mode.

The two supervision assisting devices 300 have the same configuration and purpose excepting the transparent display unit 360 and the display unit 370. Therefore, the XR-based supervision assisting device 300 according to an embodiment of the present disclosure is described with reference to FIG. 4, and additional description will be provided if there is any difference between the supervision assisting device 300 of FIG. 4 and the supervision assisting device 300 of FIG. 5.

Referring to FIG. 4, the XR-based supervision assisting device 300 includes a processor 310, a communication unit 320, a database 330, a lidar 340, a camera 350, and a transparent display unit 360.

The communication unit 320 acquires/receives 3D-based BIM design data for at least one real design object installed in the construction site.

In detail, the processor 310 can request BIM design data for the construction site to the server 200, and the server 200 can transmit BIM design data for the corresponding construction site to the supervision assisting device 300 in response to the request.

In this instance, the server 200 may transmit the BIM design data for the corresponding construction site at a time, and transmit BIM design data corresponding to the photographed image received from the supervision assisting device 300.

The database 330 can store various instructions and algorithms for operating the supervision assisting device 300, and store 3D-based BIM design data received from the server 200.

The lidar 340 may be a general lidar. When the user (supervisor) wears the supervision assisting device 300, the lidar 340 can discharge laser pulses, sense a construction site in front of the user on the basis of sensing data reflected and returned from a target object, and measure a distance from a user of various structures, for instance, facilities, facility lines, pipe lines, and the likes.

The camera 350 photographs the front of the user and, more specifically, generates a photographed image by photographing a direction that the user watches, and the server 200 analyzes the photographed image and generates an XR design object to be displayed on the transparent display unit 360.

The transparent display unit 360 is transparent and can display HMD type XR contents. The user can look forward through the transparent display unit 360, and can visually check the XR design object and the XR contents received from the server 200 since the XR design object and the XR contents are displayed on the transparent display unit 360.

The processor 310 serves to control all components in the supervision assisting device 300, and executes commands and algorithms stored in a memory and the database 330 to carry out the XR-based supervision assisting method.

Referring to FIG. 6, the operation of the processor 310 will be described in detail.

The processor 310 recognizes the real design object that the user is watching through the transparent display unit 360 on the basis of the image photographed by the camera 350. (S310)

In this instance, the processor 310 can more accurately recognize the real design object by using the sensing data of the lidar 340.

Specifically, the processor 310 recognizes the real design object that the user looks at through the transparent display unit 360 based on the image photographed by the camera 350, and calculates a distance between the user and each real design object recognized on the basis of the sensing data of the lidar 340.

The processor 310 can determine the real design object related to the sensed motion gesture as a recognition target, when it is sensed that a preset motion gesture of the user with respect to the real design object in the photographed image received from a camera 350 is included.

In this instance, the preset motion gesture may correspond to an action of indicating the real design object with the hand, an action of touching the real design object with a hand, and an action of designating a range of a specific real design facility with a hand.

In addition, the camera 350 may further include a camera (not shown) for tracking the user's gaze through gaze tracking based on the user's eye movements in addition to the camera 350 for photographing the front as described above.

The processor 310 accurately grasps the user's gaze through a gaze tracking camera (not shown), and can determine the real design object, which the user is watching during a predetermined time or more, as a recognition target.

The processor 310 obtains BIM design data for the real design object recognized in the operation S310. (S320)

As described above, the server 200 may collectively transmit the BIM design data for the corresponding construction site at a time, and provide BIM design data according to the current position of the user.

For example, the processor 310 transmits information on the real design object recognized in the operation S310 to the server 200, and requests BIM design data for the corresponding construction site.

In one embodiment, the processor 310 transmits information on the real design object recognized in the operation S310 to the server 200, and requests BIM design data necessary for the current location of the user.

In one embodiment, when an image or a code of at least one reference mark is recognized in the photographed image, the processor 310 loads location information of the corresponding reference mark and requests BIM design data within a predetermined range from the corresponding reference mark to the server 200.

In one embodiment, when an image of the reference mark photographed by the camera 350 is received from the supervision assisting device 300, the server 200 loads location information of the corresponding reference mark and transmits BIM design data within a predetermined range from the corresponding reference mark to the supervision assisting device 300.

The processor 310 renders a virtual XR design object for the real design object based on the BIM design data obtained in the operation S320. (S330)

The processor 310 displays the XR design object rendered in the operation S330 at a position corresponding to the real design object on the transparent display unit. (S340)

When the BIM design data is received from the server 200, the processor 310 renders a virtual XR design object for the real design object that the user is watching through the transparent display unit 360.

In this instance, the virtual XR design object for the real design object is rendered on the basis of the BIM design data, and indicates a design object that would have been constructed as originally intended.

However, an error may occur between the real design object and the BIM design data due to various causes. The XR-based supervision assisting device 300 according to the embodiment of the present disclosure renders and displays a virtual XR design object so that the user can check such an error through the transparent display unit 360.

The processor 310 or 210 compares the photographed image with the BIM design data of the XR design object to check an error between the real design object and the XR design object. (S350)

When the error checked in the operation S350 deviates from a predetermined allowable error range, the processor 310 or 210 informs the supervisor of the error. (S360)

In this instance, the processor 310 or 210 recognizes at least one reference mark in the photographed image and matches the real design object in the photographed image and the BIM design data of the XR design object based on the recognized reference mark to check an error.

In the embodiment of the present disclosure, the error checked by matching the real design object in the photographed image and the BIM design data of the XR design object means an error generated due to various causes during construction work, but it was supposed to be constructed according to the BIM design data and it was supposed to match the real design object with the BIM design data.

In addition, the processor 310 or 210 can specify the position of the checked error on the basis of the current location information of the supervision assisting device 300 and the position of the recognized reference mark.

When the processor 310 or 210 determines that an error deviating from the allowable range has occurred, the processor 310 or 210 informs the supervisor of occurrence of the error, and requests that the supervisor takes an action with respect to the error.

For instance, if an allowable error range is set to 98% of the matching rate, the processor 210 or 310 can inform the supervisor of occurrence of an error through the supervision assisting device 300 when an error of 97% occurs.

In this instance, the processor 210 or 310 can display a part of the real design object deviating from the allowable error range and the same part of the XR design object through a visual effect.

For example, the processor 210 or 310 can display the part of the real design object deviating from the allowable error range and the same part of the XR design object in different colors, display the part of the real design object deviating the allowable error range to be bigger, or provide a twinkling effect or a flickering effect.

The supervisor inputs an error correction signal through the supervision assisting device 300, and the processors 210 or 310 performs the next process to correct the error.

In this instance, the error correction signal may be directly input through the supervision assisting device 300. Alternatively, when the supervisor takes a specific gesture, the processor 310 or 210 recognizes the supervisor's gesture in the photographed image as an error correction signal to perform error correction.

When the error correction signal is input, the processor 310 or 210 requests correction of the BIM design data corresponding to the error checked by the server 200, and then, re-renders a virtual XR design object for the real design object on the basis of the corrected BIM design data when receiving the corrected BIM design data from the server 200, and displays it on the transparent display unit 360.

In this instance, the correction of the checked error is not necessarily performed in the server 200, but the processor 310 of the supervision assisting device 300 can directly correct the error.

In one embodiment, when the error correction signal is input, the processor 310 or 210 corrects the BIM design data so that the XR design object coincides with the real design object, re-renders a virtual XR design object for the real design object on the basis of the corrected BIM design data, and displays it on the transparent display unit 360.

In conclusion, correcting the error means to correct the BIM design data in which the error has occurred to match the constructed real design object since construction has not performed according to the BIM design data and the error between the real design object and the BIM design data has occurred.

Figure 9:
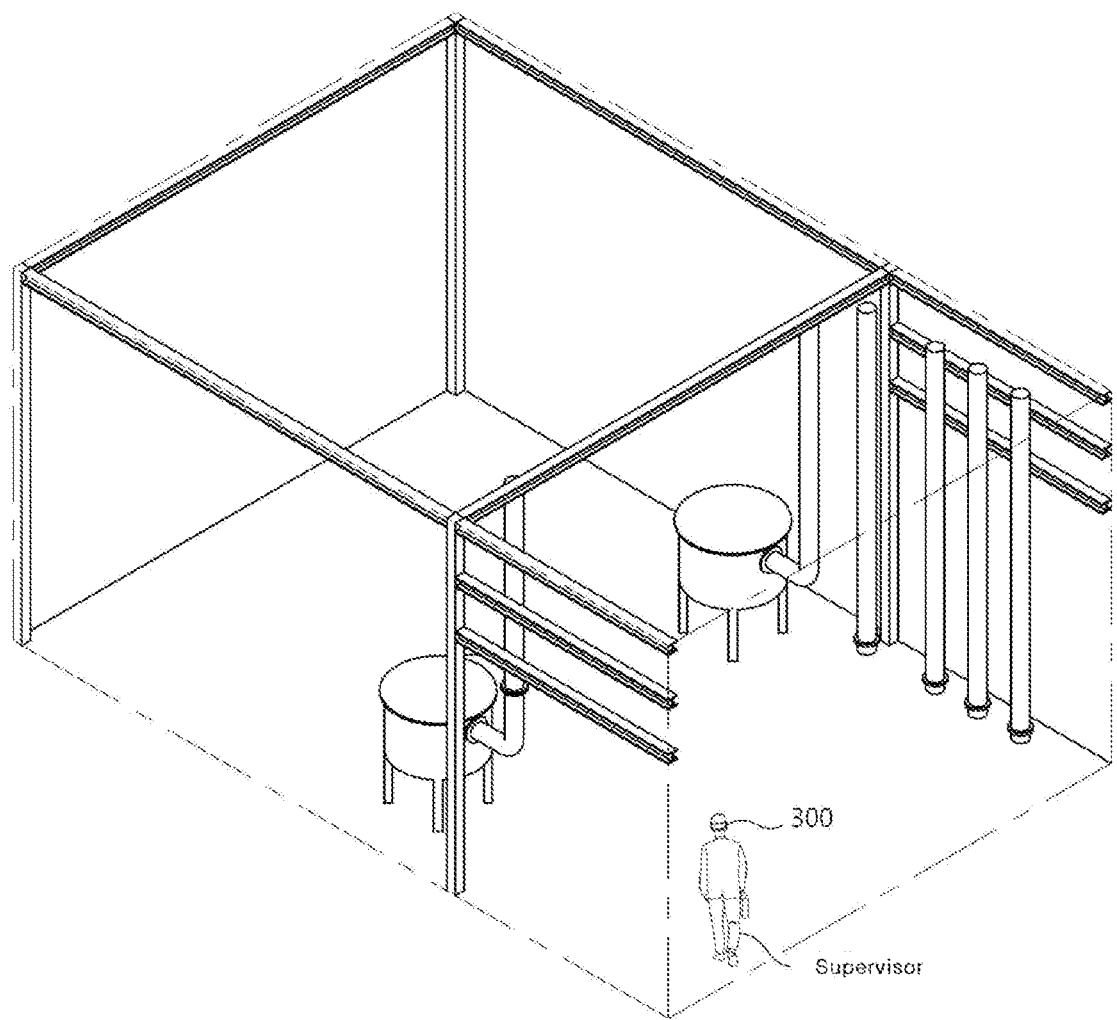
FIG. 9 is a diagram illustrating a worker wearing the supervision assisting device to supervise a construction site.

FIG. 9 is a diagram illustrating a worker wearing the winding assist device 300 and reducing the construction site.

Figure 10:
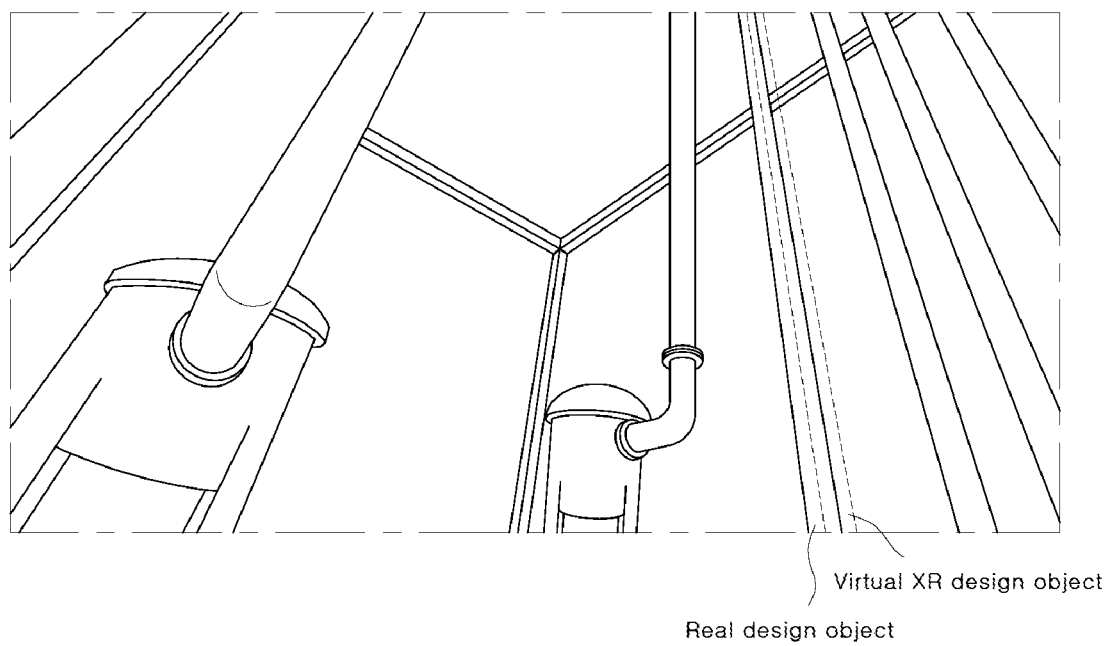
FIG. 10 is a diagram illustrating an error between a real design object photographed by the supervision assisting device and a virtual design object of a real design.

FIG. 10 is a diagram illustrating an error between a real design object photographed by the supervision assisting device and a virtual design object of a real design.

Figure 11:
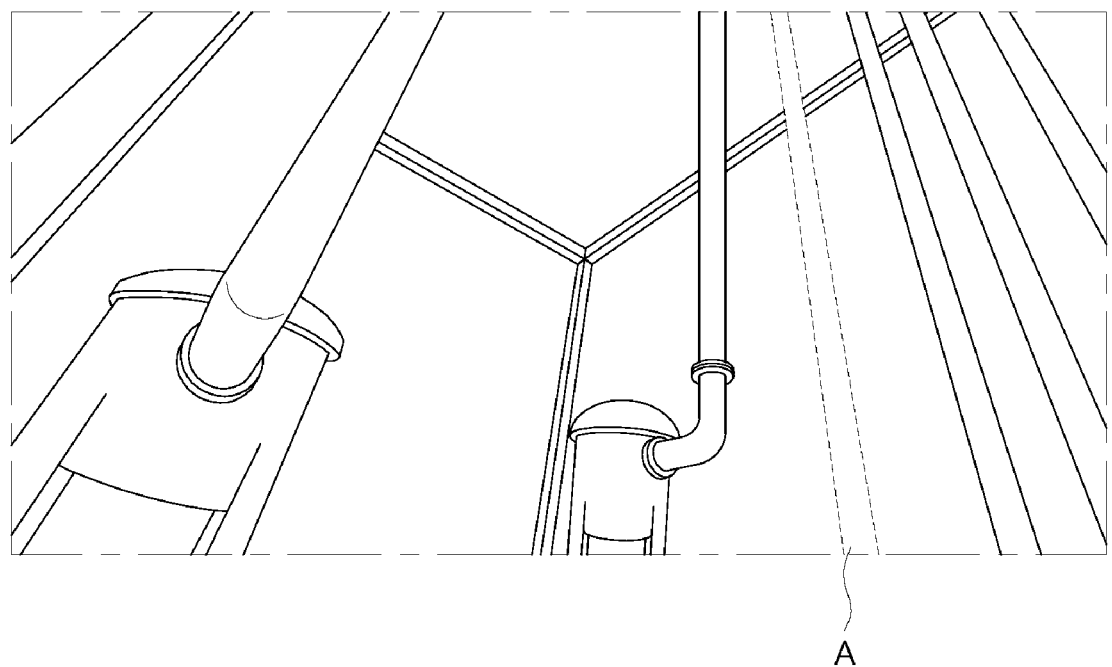
FIG. 11 is a diagram illustrating a state in which an error of BIM design data is corrected.

FIG. 11 is a diagram illustrating a state in which an error of BIM design data is corrected.

FIG. 9 illustrates a state in which a supervisor is watching a real design object in a construction site while wearing the supervision assisting device 300, and FIG. 10 illustrates a situation is displayed on the transparent display unit 360 of the supervision assisting device 300.

Furthermore, FIG. 10 illustrates that an error between the real design object and the virtual XR design object has occurred due to a construction error, and in FIG. 10, the virtual XR design object is indicated by a dotted line (the dotted line indicates a portion deviating the allowable error range).

In this instance, it is assumed that the remaining real design object is not indicated on the drawing since not having an error or being in the allowable error range.

Alternatively, it is assumed that a virtual XR design object for the real design object has been rendered on the basis of BIM design data and it is not indicated on the drawing since the real design object and the XR design object match each other in shape.

The supervisor checks such a situation through the transparent display unit 360 and inputs an error correction signal.

The processor 310 or 210 corrects the BIM design data, in which the error occurred, according to the error correction signal so that the BIM design data matches the real design object. When correction is completed, the transparent display unit 360 displays it as illustrated in FIG. 11A so that the supervisor can check there is no error in the photographed image.

Figure 12:
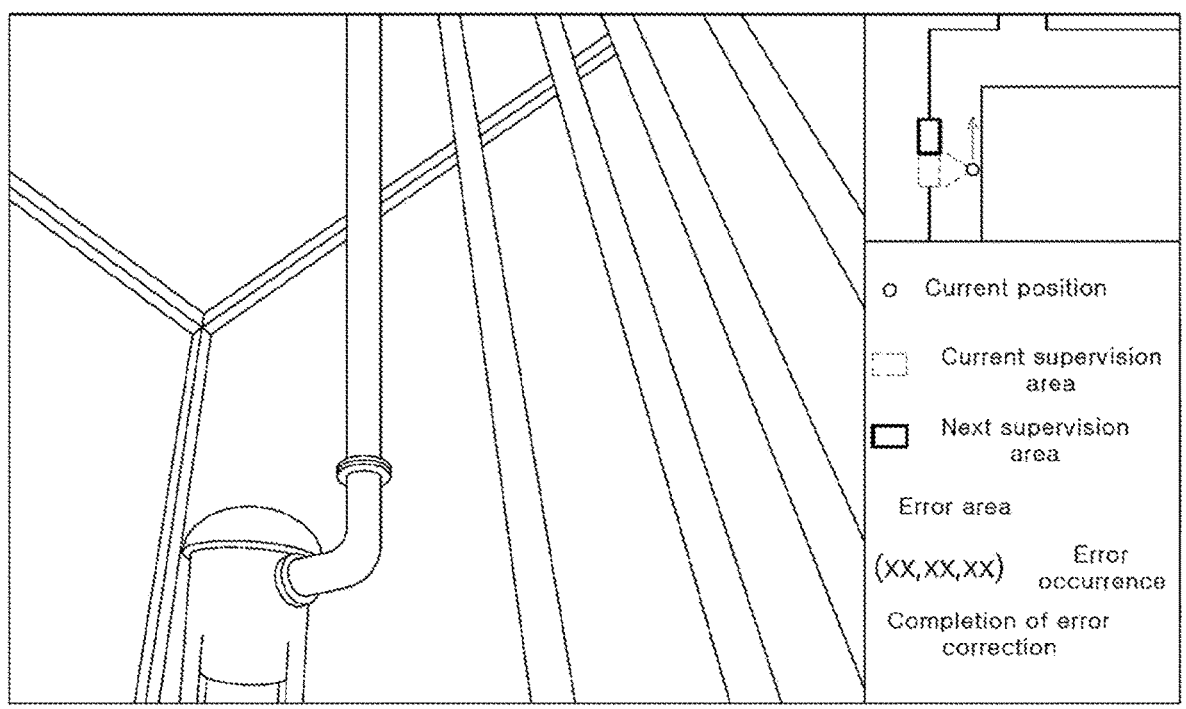
FIG. 12 is a diagram illustrating that the supervision assisting device guides an error correction history and a supervision route.

FIG. 12 is a diagram illustrating the guiding of an error correction history and a supervision path to a supervision assist device 300.

In one embodiment, the processor 310 or 210 analyzes the BIM design data to derive a supervision progress direction from a starting position of supervision.

When correction of the error in the photographed image is completed, the processor 310 or 210 renders an XR content guiding the next supervision position on the basis of the supervision progress direction and the current location of the supervision assisting device 300 and displays it on the transparent display unit 360 or the display unit 370.

In this instance, completion of correction of the error in the photographed image means that correction of the error of the real design object that the supervisor is watching through the transparent display unit 360 has been completed.

Through such a configuration, the present disclosure guides the supervisor in the supervision progress direction of the construction site so that there is no unsupervised area.

In one embodiment, the processor 310 or 210 generates learning data on the basis of the BIM design data within a predetermined range from the checked error position, and performs deep learning by inputting the learning data into an error prediction model.

In addition, when a BIM design data of a new supervision object is input, the processor 310 or 210 can analyze the BIM design data of the new supervision object based on the error prediction model, predict an error occurrence position in the new supervision object, and provide the predicted position to the supervision assisting device 300.

Through such a configuration, the supervisor can more accurately supervise a region in which it is predicted to cause an error.

In the case where the supervision assisting device 300 of FIG. 5 is applied, there are the following differences.

In the case of the supervision assisting device 300 of FIG. 4, the user watches the real design object through the transparent display unit 360 while wearing the supervision assisting device 300. However, there are the following differences between the supervision assisting device 300 of FIG. 4 and the supervision assisting device 300 of FIG. 5 since the supervisor uses the supervision assisting device 300 of FIG. 5 while carrying it with the hand.

The supervisor photographs the front by using the cart of the supervision assisting device 300. The processor 310 or 210 displays the photographed image including the real design object photographed by the camera 350 on the display unit 370, obtains BIM design data with respect to the recognized real design object in the photographed image, renders a virtual XR design object for the real design based on the obtained BIM design data, and displays the rendered XR design object at a position corresponding to the real design object on the display unit 370.

In this instance, since the supervision assisting device 300 may be a terminal, such as a smartphone, a tablet PC or the like, or a computer, the display unit 370 may be operated as an input means and as an output means, and the supervisor can input various control signals to the display unit 370.

When determining that an error exceeding the allowable range has occurred, the processor 310 or 210 provides a notification that the error has occurred through the display unit 370 and requests the supervisor to take an action about the error.

The supervisor inputs an error correction signal to the display unit 370, and the processor 310 or 210 performs the next process to correct the error.

Now, with reference to FIGS. 7 and 8, the server 200 for providing design, construction and supervision services in a construction site will be described.

In this instance, since the server 200 has the same operation as the server 200, which has been mentioned in the description of the supervision assisting device 300, the repeated description will be omitted.

FIG. 7 is a block diagram of a server for providing design, construction, and supervision services according to an embodiment of the present disclosure.

Figure 8:
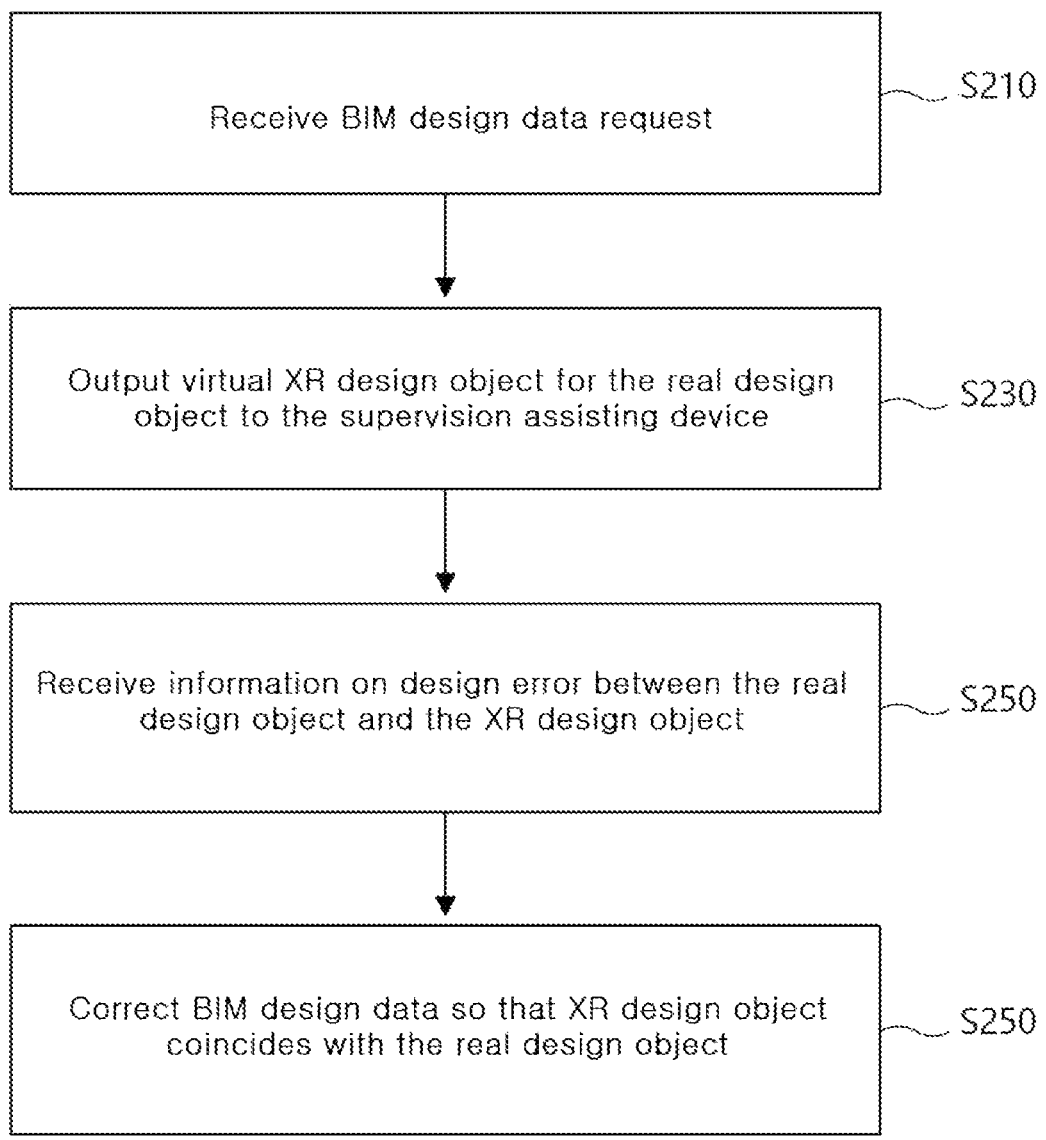
FIG. 8 is a flow chart of a method for providing design, construction, and supervision services according to an embodiment of the present disclosure.

FIG. 8 is a flow chart of a method for providing design, construction, and supervision services according to an embodiment of the present disclosure.

FIG. 9 is a diagram illustrating a state in which a supervisor supervises a construction site while wearing the supervision assisting device.

As described above, the server 200 for providing design, construction, and supervision services according to an embodiment of the present disclosure may include an automatic facility design device.

Referring to FIG. 4, the server 200 for providing design, construction, and supervision services according to an embodiment of the present disclosure includes a processor 210, a communication unit 220, and a database 230. In some embodiments, the server 200 may further include an input/output unit 240 for receiving various control signals and outputting a result.

The communication unit 220 performs communication with the XR-based supervision assisting device which the supervisor wears or carries.

In addition, the communication unit 220 may receive BIM design data from the automatic facility design device, and transmit the BIM design data to a construction company server 200 and a construction company terminal.

The database 230 can store 3D-based BIM design data of the construction site, internal structure information of the construction site, and a variety of information on facilities which will be arranged in the construction site.

The processor 210 serves to operate all components in the server 200, and executes commands and algorithms stored in a memory and the database 230 so as to provide design, construction, and supervision service of the construction site.

Hereinafter, referring now to FIG. 5, a method for providing design, construction, and supervision services of a construction site is described in detail.

The processor 210 receives a request of BIM design data for a real design object of a specific construction site from the supervision assisting device 300. (S210).

The processor 210 provides the BIM design data to the supervision assisting device 300 to output a virtual XR design object for the real design object to the supervision assisting device 300. (S230)

The processor 210 receives information indicating an error between the real design object and the XR design object from the supervision assisting device 300. (S250)

Based on the error information received by the processor 210, the BIM design data is corrected to make the XR design object fit the real design object. (S270)

In this instance, the error information is received when the error between the real design object and the XR design object is out of the allowable error range, and the error information can be received when a correction request signal is input by the supervisor.

The processor 210 provides the BIM design data for the construction site to a builder, and more specifically, the processor 210 can provide the BIM design data to a builder terminal or the server 200 through the communication unit 220.

The processor 210 generates a design review and provides the design review to the supervision assisting device so that the supervisor can supervise and review the construction site.

When receiving a design review, in which a plurality of review items have been completely checked, from the supervision assisting device 300, the processor 210 stores the design review in the database 230.

In one embodiment, the database 230 stores a plurality of review items for generating a design review.

In one embodiment, the processor 210 derives at least one review item based on the BIM design data for the construction site, the internal structure information of the construction site, and the error information received from the supervision assisting device 300, and generates a design review based on the derived review items.

The processor 210 analyzes the BIM design data to derive a supervision progress direction from a starting position of supervision. When completing correction with respect to a specific error, the processor 210 provides an XR content, which guides the supervision progress direction and the next supervision position based on the current position of the supervision assisting device, to the supervision assisting device to render the XR content to the transparent display unit 360 of the supervision assistant device 300.

The database 230 stores location information and BIM design data for at least one reference mark installed in the construction site.

In one embodiment, when receiving a code and an image of the reference mark photographed by the supervision assisting device 300, the processor 210 can load location information of the corresponding reference mark, and transmit the BIM design data within a predetermined range from the corresponding reference mark to the supervision assisting device 300.

In one embodiment, a specific image including a code value, a barcode, a QR code, and the like may be applied as the reference mark, and a code value included in the reference mark is matched with location information in the construction site or mapped with the BIM design data.

The processor 210 recognizes the code value corresponding to the reference mark in the photographed image and transmits the code value to the server 200. The server 200 can load BIM design data matched with the received code value among lots of BIM design data stored in the database to transmit the BIM design data to the supervision assisting device 300.

The reference mark can be installed in a reference mark installation position derived from the automatic facility design device 100 for a supervision service.

In one embodiment, when the error is greater than the allowable error range, the processor 210 corrects the BIM design data so that a part causing the error in the BIM design data matches the real design object, and provides the corrected BIM design data to the supervision assisting device.

In one embodiment, the processor 210 generates learning data on the basis of the BIM design data within a predetermined range from an error occurrence position, and performs deep learning by inputting the generated learning data to an error prediction model.

When a BIM design data of a new supervision object is input, the processor 210 analyzes the BIM design data of the new supervision object based on the error prediction model, and predicts an error occurrence position in the new supervision object.

The processor 210 can provide the predicted position to the supervision assisting device 300.

In one embodiment, the processor 210 analyzes the BIM design data around the error received from the supervision assisting device 300 in the BIM design data by using the error prediction model, predicts a position of another error which may occur due to the above error, and provides the predicted position of the other error to the supervision assisting device 300.

For example, when a construction error occurs in a specific real design object, since a construction error may occur in the corresponding real design object and another real design object which is located near or is related to the corresponding real design object due to the error, the present disclosure analyzes the construction error and informs of the construction error in an early stage.

The method according to an embodiment of the present disclosure can be implemented as a program (or application) to be executed by being combined with a server which is hardware, and can be stored in a medium.

The program may include code coded as a computer language, such as C, C++, Java, machine language, etc. which a processor (CPU) of the computer can read through a device interface of a computer. The code may include a functional code associated with a function that defines necessary functions for executing the methods, and may include an execution procedure-related control code in which the processor of the computer needs to execute the functions according to predetermined procedures. In addition, the code may further include additional information necessary for the processor of the computer to execute the functions or memory reference-related code for whether the media should be referenced in which location (address) of the internal or external memory of the computer. Moreover, if communication with any other computer or server in a remote location is required to execute the functions by the process of the computer, the code may further include communication-related code for how to communicate with any other computer or server at a remote location using the communication module of the computer, or whether or not any information or media should be transmitted and received in the communication.

The medium to be stored refers not to a medium storing data for a short time but to a medium that stores data semi-permanently, like a register, cache, memory, and the like, and means a medium readable by a device. In detail, as examples of the medium to be stored, there are read-only memories (ROMs), random access memories (RAMs), CD-ROMs, magnetic tapes, floppy disks, optical data storage devices, and the likes, but the present disclosure is not limited thereto. That is, the program can be stored in various recording media on a variety of servers that can be accessed by a computer or various recording media on the user's computer. Furthermore, the media can store code that is distributed to a computer device connected to the network and that is readable by the computer in a distributed fashion.

The method or algorithm described in relation to the embodiments of the present disclosure can be directly embodied in hardware, can be embodied in a software module executed by hardware, or can be embodied by combination thereof. The software module can reside in a random access memory (RAM), a read-only memory (ROM), an erasable programmable read-only memory (EPROM), an electrically erasable programmable read-only memory (EEPROM), a flash memory, a hard disk, a detachable disk, a CD-ROM, or a medium readable by a computer, well-known in the technical field to which the present disclosure belongs.

The above description is only exemplary, and it will be understood by those skilled in the art that the disclosure may be embodied in other concrete forms without changing the technological scope and essential features. Therefore, the above-described embodiments should be considered only as examples in all aspects and not for purposes of limitation.

Advantageous Effects

As set forth above, the present disclosure can assist supervision using the extended reality (XR)-based supervision assisting device.

Furthermore, the present disclosure can find a construction error by comparing a real design object photographed by a camera of the supervision assisting device with building information modelling (BIM) design data, and notify the construction error to the supervision assisting device.

In addition, the present disclosure can correct the BIM design data to fit the real design object when the construction error between the real design object and the BIM design data exceeds a preset error tolerance range, thereby adjusting the BIM design data according to the construction error.

The advantages of the present disclosure are not limited to the above-mentioned advantages, and other advantages, which are not specifically mentioned herein, will be clearly understood by those skilled in the art from the following description.

The invention claimed is:

1. An extended reality (XR)-based wearable supervision assisting device for assisting supervision of a construction site, the XR-based wearable supervision assisting device comprising:
  a camera configured to photograph an image, wherein the camera comprises a gaze tracking camera configured to track a supervisor's gaze based on eye movements of the supervisor;
  a transparent display unit;
  a communication unit acquiring 3D-based building information modelling (BIM) design data for at least one real design object actually installed in the construction site; and
  a processor performing operations of:
  grasping the supervisor's gaze through the gaze tracking camera;
  determining a real design object, which the supervisor is watching during a predetermined period of time or more, as a recognition target;
  acquiring the BIM design data for the determined real design object through the communication unit;
  rendering a virtual XR design object for the determined real design object on the basis of the acquired BIM design data;
  displaying the rendered XR design object at a position corresponding to the determined real design object on the transparent display unit;
  comparing the BIM design data of the XR design object with the photograph image, and checking an error between the XR design object and the determined real design object; and
  informing the supervisor of that the checked error deviates from a predetermined allowable error range,
  wherein the processor analyzes the BIM design data and derives a supervision progress direction from a starting position of the supervision,
  wherein the processor determines a completion of correction of the error in the photographed image when correction of the error of the determined real design object that the supervisor is watching through the transparent display unit has been completed, and
  wherein when the completion of correction of the error is determined, the processor renders and displays an XR content guiding a next supervision position on the basis of the supervision progress direction and a current position of the supervision assisting device.

2. The XR-based wearable supervision assisting device according to claim 1, wherein the processor performs the operations of:
  recognizing at least one reference mark in the image;
  checking an error by matching the real design object in the image with the BIM design data of the XR design object based on the recognized reference mark; and
  specifying a position of the checked error on the basis of current location information of the supervision assisting device and the position of the recognized reference mark.

3. The XR-based wearable supervision assisting device according to claim 2, wherein the processor performs the operations of:
  requesting correction of the BIM design data corresponding to the checked error to a server according to a control signal input to the supervision assisting device; and
  re-rendering the virtual XR design object for the real design object on the basis of the corrected BIM design data when receiving the BIM design data in which the error is corrected from the server.

4. The XR-based wearable supervision assisting device according to claim 3, wherein the server stores location information on at least one reference mark installed in the construction site and the BIM design data, loads the location information of a corresponding reference mark when receiving an image of the reference mark photographed by the camera from the supervision assisting device, and transmits the BIM design data within a predetermined range from the corresponding reference mark to the supervision assisting device.

5. The XR-based supervision assisting device according to claim 3, wherein when the checked error exceeds an allowable error range, the server corrects a portion of the BIM design data in which the error has occurred to match the real design object, and provides the corrected BIM design data to the supervision assisting device, and
  wherein the processor renders a virtual XR design object for the real design object on the basis of the corrected BIM design data received from the server, and provides correction completion information.

6. The XR-based wearable supervision assisting device according to claim 3, wherein the server generates learning data on the basis of the BIM design data within a predetermined range from the checked error position and performs deep learning by inputting the learning data into an error prediction model, wherein when a BIM design data of a new supervision object is input, the processor analyzes the BIM design data of the new supervision object based on the error prediction model, predicts an error occurrence position in the new supervision object, and provides the predicted position to the supervision assisting device.

7. An extended reality (XR)-based wearable supervision assisting device for assisting supervision of a construction site, the XR-based wearable supervision assisting device comprising:
 a camera configured to photograph an image, wherein the camera comprises a gaze tracking camera configured to track a supervisor's gaze based on eye movements of the supervisor;
 a display unit;
 a communication unit acquiring 3D-based building information modelling (BIM) design data for at least one real design object actually installed in the construction site; and
 a processor performing operations of:
 grasping the supervisor's gaze through the gaze tracking camera;
 determining a real design object, which the supervisor is watching during a predetermined period of time or more, as a recognition target;
 acquiring the BIM design data for the determined real design object in the photographed image;
 rendering a virtual XR design object for the determined real design object on the basis of the acquired BIM design data;
 displaying the rendered XR design object at a position corresponding to the determined real design object on the display unit;
 comparing the BIM design data of the XR design object with the photograph image, and checking an error between the XR design object and the determined real design object; and
 informing the supervisor of that the checked error deviates from a predetermined allowable error range,
 wherein the processor analyzes the BIM design data and derives a supervision progress direction from a starting position of the supervision,
 wherein the processor determines a completion of correction of the error in the photographed image when correction of the error of the determined real design object that the supervisor is watching through the display unit has been completed, and
 wherein when the completion of correction of the error is determined, the processor renders and displays an XR content guiding a next supervision position on the basis of the supervision progress direction and a current position of the supervision assisting device.

8. The XR-based wearable supervision assisting device according to claim 7, wherein the processor performs the operations of:
 recognizing at least one reference mark in the image;
 checking an error by matching the real design object in the image with the BIM design data of the XR design object based on the recognized reference mark; and
 specifying a position of the checked error on the basis of current location information of the supervision assisting device and the position of the recognized reference mark.

9. The XR-based wearable supervision assisting device according to claim 8, wherein the processor performs the operations of:
 requesting correction of the BIM design data corresponding to the checked error to a server according to a control signal input to the supervision assisting device; and
 re-rendering the virtual XR design object for the real design object on the basis of the corrected BIM design data when receiving the BIM design data in which the error is corrected from the server.

10. The XR-based wearable supervision assisting device according to claim 9, wherein the server stores location information on at least one reference mark installed in the construction site and the BIM design data, loads the location information of a corresponding reference mark when receiving an image of the reference mark photographed by the camera from the supervision assisting device, and transmits the BIM design data within a predetermined range from the corresponding reference mark to the supervision assisting device.

11. The XR-based wearable supervision assisting device according to claim 9, wherein when the checked error exceeds an allowable error range, the server corrects a portion of the BIM design data in which the error has occurred to match the real design object, and provides the corrected BIM design data to the supervision assisting device, and
 wherein the processor renders a virtual XR design object for the real design object on the basis of the corrected BIM design data received from the server, and provides correction completion information.

12. The XR-based wearable supervision assisting device according to claim 9, wherein the server generates learning data on the basis of the BIM design data within a predetermined range from the checked error position and performs deep learning by inputting the learning data into an error prediction model,
 wherein when a BIM design data of a new supervision object is input, the processor analyzes the BIM design data of the new supervision object based on the error prediction model, predicts an error occurrence position in the new supervision object, and provides the predicted position to the supervision assisting device.

13. An extended reality (XR)-based supervision assisting method carried out by an extended reality (XR)-based wearable supervision assisting device for assisting supervision of a construction site, the XR-based wearable supervision assisting method comprising:
 grasping a supervisor's gaze through a gaze tracking camera of the XR-based wearable supervision assisting device, based on eye movements of the supervisor;
 determining a real design object, which the supervisor is watching through a transparent display unit of the XR-based wearable supervision assisting device during a predetermined period of time or more, as a recognition target;
 acquiring building information modelling (BIM) design data for the determined real design object;
 rendering a virtual XR design object for the determined real design object on the basis of the acquired BIM design data;
 displaying the rendered XR design object at a position corresponding to the determined real design object on the transparent display unit;
 comparing the BIM design data of the XR design object with an image photographed by a camera of the XR-based wearable supervision assisting device, and checking an error between the XR design object and the determined real design object;

informing the supervisor of that the checked error deviates from a predetermined allowable error range;

analyzing the BIM design data and derives a supervision progress direction from a starting position of the supervision;

determining a completion of correction of the error in the photographed image when correction of the error of the determined real design object that the supervisor is watching through the transparent display unit has been completed; and when the completion of correction of the error is determined, rendering and displaying an XR content guiding a next supervision position on the basis of the supervision progress direction and a current position of the supervision assisting device.

14. The method according to claim 13, wherein the supervision assisting device performs operations of:

recognizing at least one reference mark in the image;

checking an error by matching the real design object in the image with the BIM design data of the XR design object based on the recognized reference mark; and specifying a position of the checked error on the basis of current location information of the supervision assisting device and the position of the recognized reference mark.

15. The method according to claim 14, wherein the supervision assisting device performs operations of:

requesting correction of the BIM design data corresponding to the checked error to a server according to a control signal input to the supervision assisting device; and re-rendering the virtual XR design object for the real design object on the basis of the corrected BIM design data when receiving the BIM design data in which the error is corrected from the server.

16. The method according to claim 15, wherein the server stores location information on at least one reference mark installed in the construction site and the BIM design data, loads the location information of a corresponding reference mark when receiving an image of the reference mark photographed by the camera from the supervision assisting device, and transmits the BIM design data within a predetermined range from the corresponding reference mark to the supervision assisting device.

17. The method according to claim 15, wherein when the checked error exceeds an allowable error range, the server corrects a portion of the BIM design data in which the error has occurred to match the real design object, and provides the corrected BIM design data to the supervision assisting device, and wherein the XR-based wearable supervision assisting device renders a virtual XR design object for the real design object on the basis of the corrected BIM design data received from the server, and provides correction completion information.

18. A non-transitory computer-readable recording medium which is combined with a computer, which is hardware and stores a program for executing the method of claim 13.

* * * * *